US012638949B2

(12) United States Patent
Zhang

(10) Patent No.: US 12,638,949 B2
(45) Date of Patent: May 26, 2026

(54) PROCESSING METHOD AND DEVICE

(71) Applicant: Lenovo (Beijing) Limited, Beijing (CN)

(72) Inventor: Liang Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 322 days.

(21) Appl. No.: 18/465,781

(22) Filed: Sep. 12, 2023

(65) Prior Publication Data

US 2024/0220065 A1    Jul. 4, 2024

(30) Foreign Application Priority Data

Dec. 31, 2022    (CN) .......................... 202211741056.3

(51) Int. Cl.
| | |
|---|---|
| *G06F 3/04812* | (2022.01) |
| *A63F 13/57* | (2014.01) |
| *A63F 13/573* | (2014.01) |
| *G06F 3/04817* | (2022.01) |
| *G06F 3/0484* | (2022.01) |
| *A63F 7/04* | (2006.01) |
| *A63F 13/00* | (2014.01) |
| *G06F 3/0481* | (2022.01) |
| *G06F 3/0486* | (2013.01) |

(52) U.S. Cl.
CPC .......... *G06F 3/04812* (2013.01); *A63F 13/57* (2014.09); *A63F 13/573* (2014.09); *G06F 3/04817* (2013.01); *G06F 3/0484* (2013.01); *A63F 7/04* (2013.01); *A63F 13/00* (2013.01); *G06F 3/0481* (2013.01); *G06F 3/0486* (2013.01)

(58) Field of Classification Search
CPC ............ G06F 3/04812; G06F 3/04817; G06F 3/0481; G06F 3/0484; G06F 3/0486; A63F 13/00; A63F 13/57; A63F 13/573; A63F 7/04
See application file for complete search history.

(56) References Cited

U.S. PATENT DOCUMENTS

| | | | |
|---|---|---|---|
| 2004/0002380 A1* | 1/2004 | Brosnan ................ | A63F 13/573 463/32 |
| 2010/0241979 A1* | 9/2010 | Apted ....................... | G06T 3/40 715/764 |

(Continued)

FOREIGN PATENT DOCUMENTS

| | | | | |
|---|---|---|---|---|
| WO | WO-2024139477 A1 * | 7/2024 | ........... | G06F 3/0488 |

*Primary Examiner* — Ting Z Lee
(74) *Attorney, Agent, or Firm* — ANOVA LAW GROUP, PLLC

(57) ABSTRACT

A processing method includes obtaining an interactive interface, displaying the interactive interface through a display screen, obtaining a trajectory of an operation object, and in response to the trajectory of the operation object and the target interactive area satisfying a trigger condition of an interactive action of the target interactive area, executing the interactive action. The interactive interface includes a target interactive area. The display screen does not have display pixels corresponding to the target interactive area. The display screen includes an inner contour and an outer contour. Display pixels of the display screen are in a display area formed between the outer contour and the inner contour. The target interactive area corresponds to the inner contour.

16 Claims, 10 Drawing Sheets

(56)                    References Cited

U.S. PATENT DOCUMENTS

2011/0018197 A1\*   1/2011  Black ..................... A63F 7/041
                                                        463/9
2011/0197153 A1\*   8/2011  King ................... G06F 3/04883
                                                        345/173
2013/0345593 A1\*  12/2013  Burns ................... G16H 50/30
                                                        600/300

\* cited by examiner

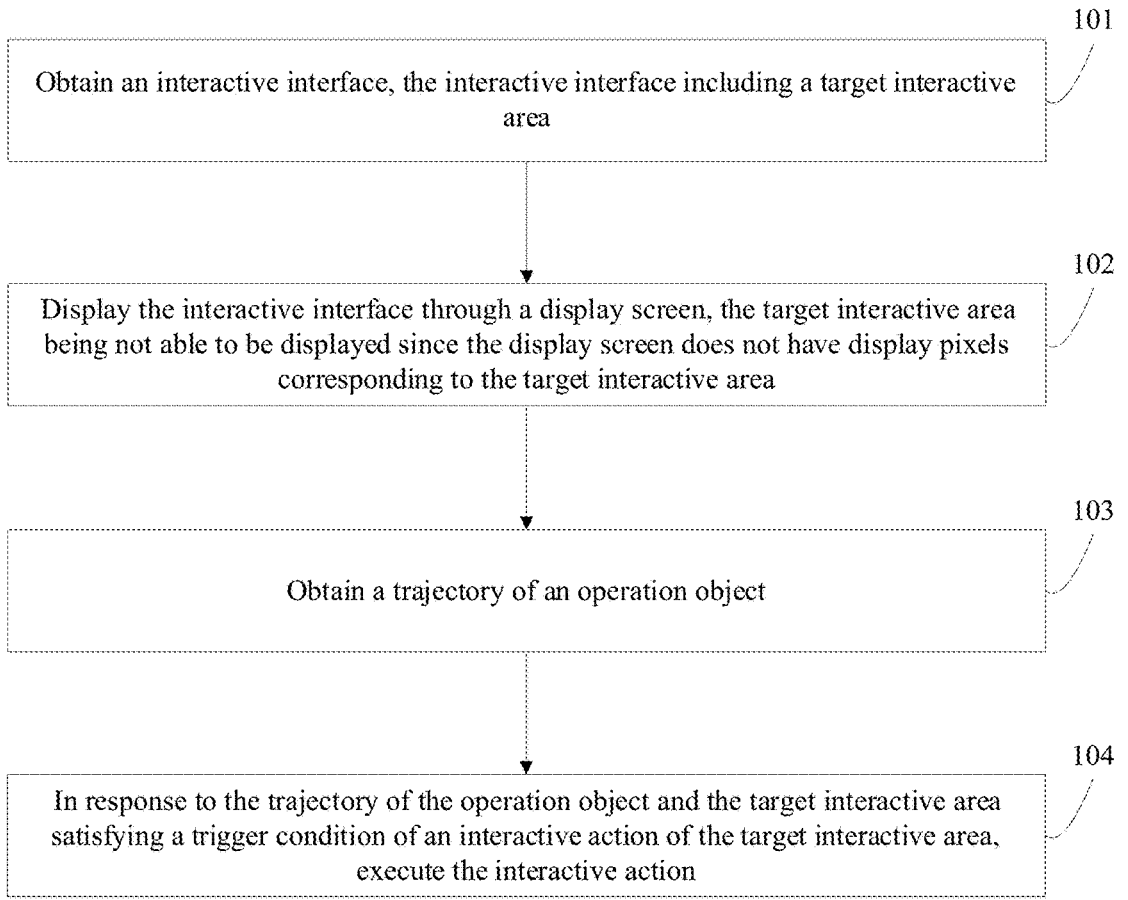

101

Obtain an interactive interface, the interactive interface including a target interactive area

102

Display the interactive interface through a display screen, the target interactive area being not able to be displayed since the display screen does not have display pixels corresponding to the target interactive area

103

Obtain a trajectory of an operation object

104

In response to the trajectory of the operation object and the target interactive area satisfying a trigger condition of an interactive action of the target interactive area, execute the interactive action

FIG. 1

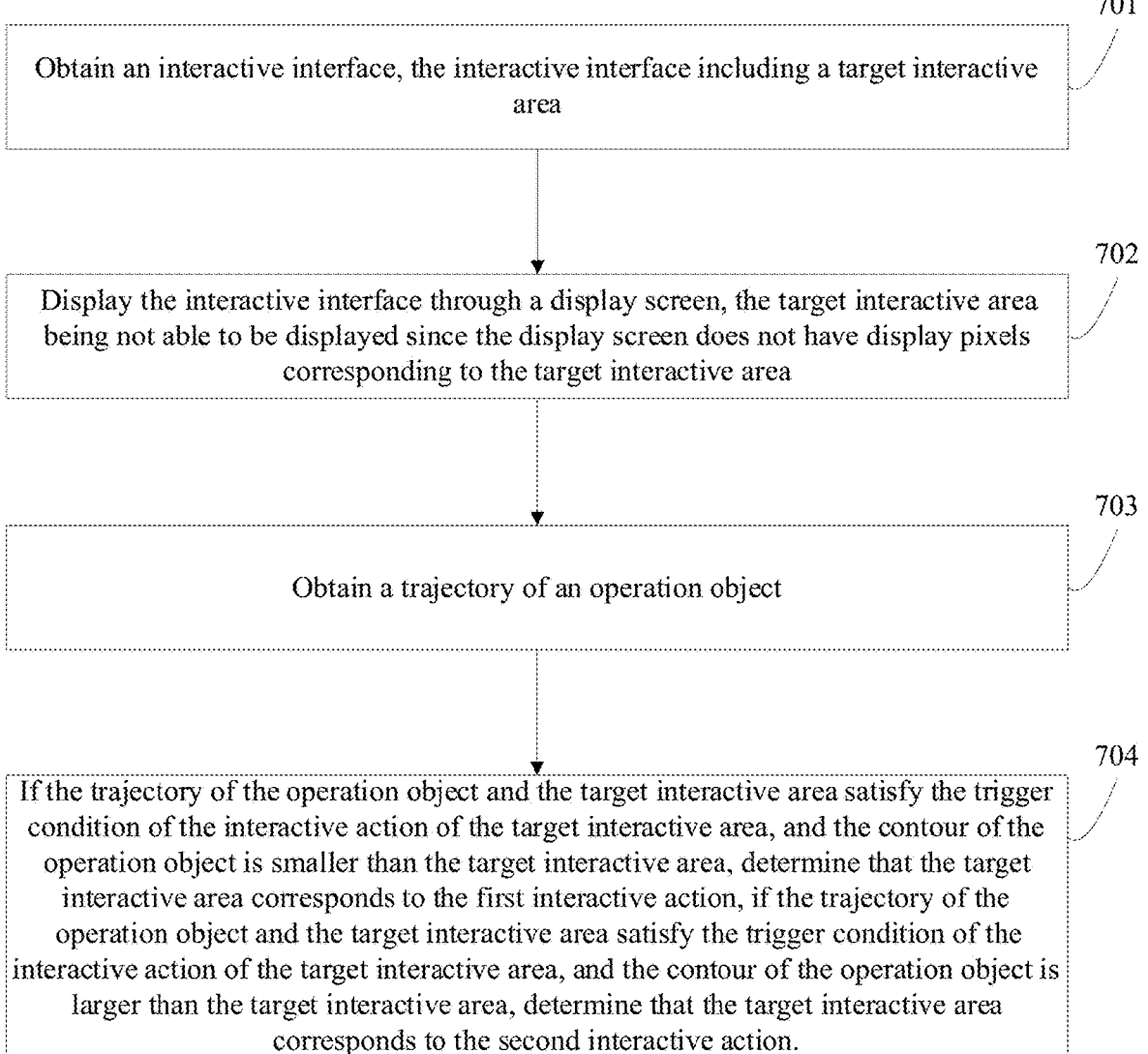

701

Obtain an interactive interface, the interactive interface including a target interactive area

702

Display the interactive interface through a display screen, the target interactive area being not able to be displayed since the display screen does not have display pixels corresponding to the target interactive area

703

Obtain a trajectory of an operation object

704

If the trajectory of the operation object and the target interactive area satisfy the trigger condition of the interactive action of the target interactive area, and the contour of the operation object is smaller than the target interactive area, determine that the target interactive area corresponds to the first interactive action, if the trajectory of the operation object and the target interactive area satisfy the trigger condition of the interactive action of the target interactive area, and the contour of the operation object is larger than the target interactive area, determine that the target interactive area corresponds to the second interactive action.

FIG. 7A

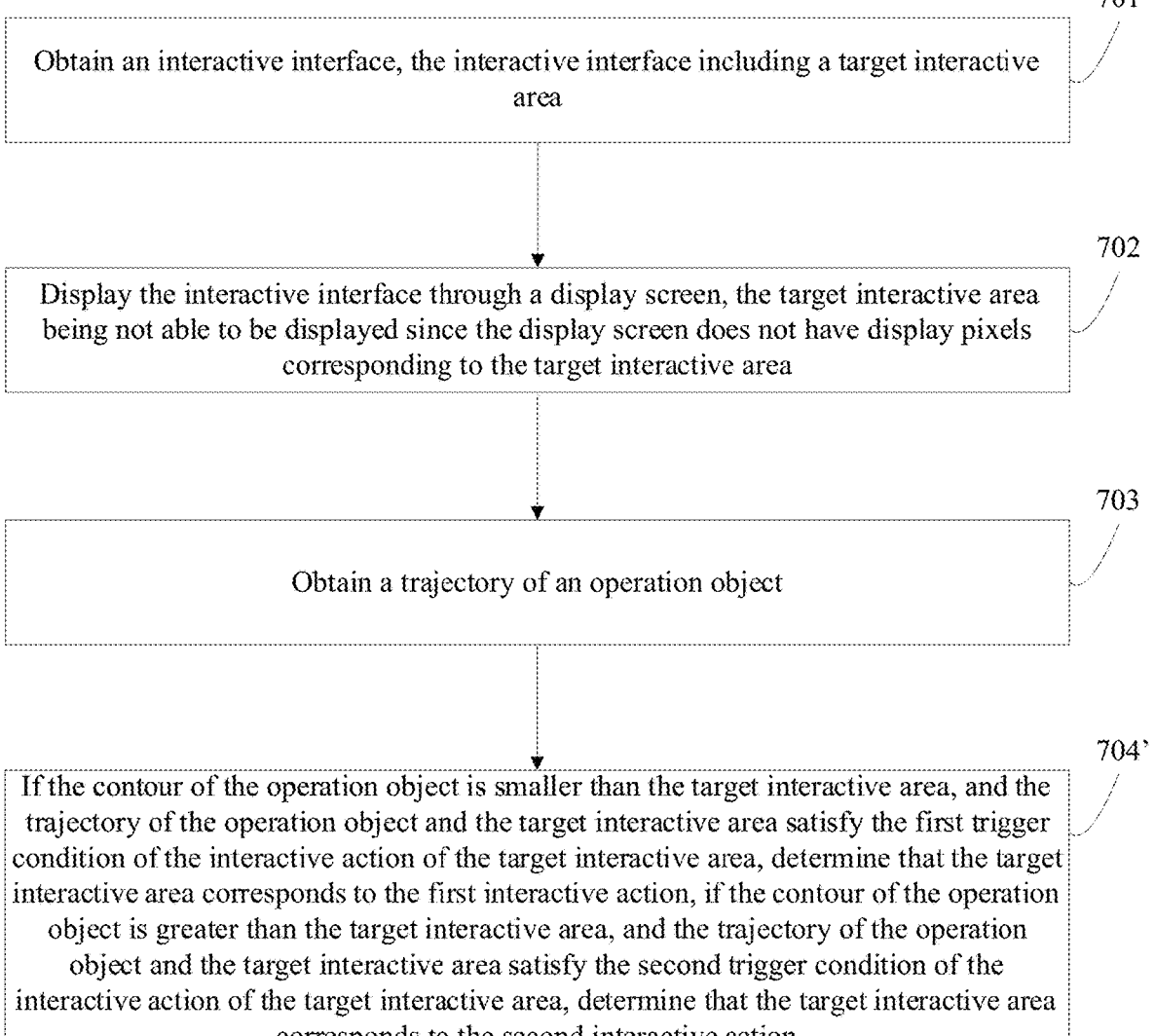

701

Obtain an interactive interface, the interactive interface including a target interactive area

702

Display the interactive interface through a display screen, the target interactive area being not able to be displayed since the display screen does not have display pixels corresponding to the target interactive area

703

Obtain a trajectory of an operation object

704'

If the contour of the operation object is smaller than the target interactive area, and the trajectory of the operation object and the target interactive area satisfy the first trigger condition of the interactive action of the target interactive area, determine that the target interactive area corresponds to the first interactive action, if the contour of the operation object is greater than the target interactive area, and the trajectory of the operation object and the target interactive area satisfy the second trigger condition of the interactive action of the target interactive area, determine that the target interactive area corresponds to the second interactive action

FIG. 7B

PROCESSING METHOD AND DEVICE

CROSS-REFERENCE TO RELATED APPLICATION

The present disclosure claims priority to Chinese Patent Application No. 202211741056.3, filed on Dec. 31, 2022, the entire content of which is incorporated herein by reference.

TECHNICAL FIELD

The present disclosure relates to the display processing technology field and, more particularly, to a processing method and device based on a specific display unit.

BACKGROUND

With the development of technology, a display screen with a hole is often used in electronic devices. Thus, the electronic device has a screen ratio and a narrower frame. However, in many use scenarios, the display screen with the hole brings inconvenience to the user. Often, ring-shaped information is displayed around the hole, e.g., a circular power display, which can be used to indicate the battery power of the electronic device. Moreover, the area of the hole is not interactive.

SUMMARY

Embodiments of the present disclosure provide a processing method. The method includes obtaining an interactive interface, displaying the interactive interface through a display screen, obtaining a trajectory of an operation object, and in response to the trajectory of the operation object and the target interactive area satisfying a trigger condition of an interactive action of the target interactive area, executing the interactive action. The interactive interface includes a target interactive area. The target interactive area is not able to be displayed since the display screen does not have display pixels corresponding to the target interactive area. The display screen includes an inner contour and an outer contour. Display pixels of the display screen are in a display area formed between the outer contour and the inner contour. The target interactive area corresponds to the inner contour.

Embodiments of the present disclosure provide a processing device, including a first acquisition unit, a display unit, a second acquisition unit, and an execution unit. The first acquisition unit is configured to obtain an interactive interface. The interactive interface includes a target interactive area. The display unit is configured to display the interactive interface through a display screen. The target interactive area is not able to be displayed since the display screen does not have display pixels corresponding to the target interactive area. The display screen includes an inner contour and an outer contour. Display pixels of the display screen are in a display area formed between the outer contour and the inner contour. The target interactive area corresponds to the inner contour. The second acquisition unit is configured to obtain a trajectory of an operation object. The execution unit is configured to, in response to the trajectory of the operation object and the target interactive area satisfying a trigger condition of an interactive action of the target interactive area, execute the interactive action.

Embodiments of the present disclosure provide a non-transitory computer-readable storage medium storing executable instructions that, when executed by a processor, cause the processor to obtain an interactive interface, display the interactive interface through a display screen, obtain a trajectory of an operation object, and in response to the trajectory of the operation object and the target interactive area satisfying a trigger condition of an interactive action of the target interactive area, execute the interactive action. The interactive interface includes a target interactive area. The target interactive area is not able to be displayed since the display screen does not have display pixels corresponding to the target interactive area. The display screen includes an inner contour and an outer contour. Display pixels of the display screen are in a display area formed between the outer contour and the inner contour. The target interactive area corresponds to the inner contour.

BRIEF DESCRIPTION OF THE DRAWINGS

FIG. 1 illustrates a schematic flowchart of a processing method according to some embodiments of the present disclosure.

FIG. 7A illustrates a schematic flowchart of a processing method according to some embodiments of the present disclosure.

FIG. 7B illustrates another schematic flowchart of the processing method of FIG. 7A.

DETAILED DESCRIPTION OF THE EMBODIMENTS

To make the purposes, features, and advantages of the present disclosure clear, the technical solutions of the present disclosure are described in detail in connection with the accompanying drawings. The described embodiments cannot be considered to limit the present disclosure. All other embodiments obtained by those of ordinary skill in the art without creative efforts are within the scope of the present disclosure.

FIG. 1 illustrates a schematic flowchart of a processing method according to some embodiments of the present disclosure. As shown in FIG. 1, the processing method of the present disclosure includes the following steps.

At 101, an interactive interface is obtained. The interactive interface includes a target interactive area.

In embodiments of the present disclosure, an interactive interface that is to be displayed can be obtained through a bottom data interface of a system, such as a data output interface of an image processing chip. This interactive interface can be an interactive interface of an operating system of a mobile terminal, or an interactive interface of an application based on the operating system, which is not limited here. The interactive interface can be used to define one or more interactive areas. Each interactive area can be configured with an interactive action. When an interactive area of the interactive interface is triggered, an interactive action can be performed in response to the triggering. The target interactive area can belong to the interactive area of the interactive interface.

At 102, the interactive interface is displayed through a display screen. Since the display screen does not have display pixels corresponding to the target interactive area, the target interactive area cannot be displayed.

Figure 2:
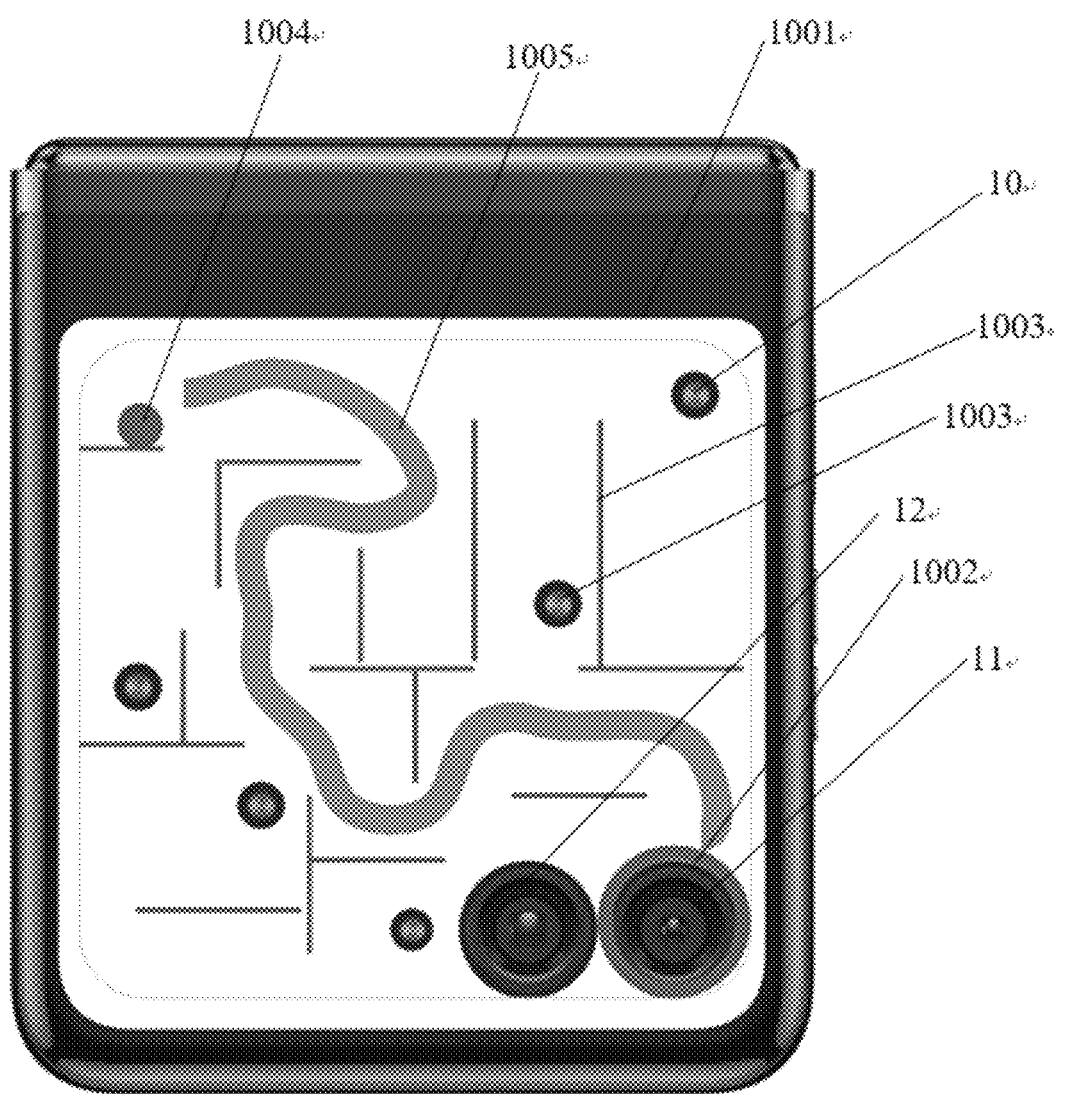
FIG. 2 illustrates a schematic diagram of a display screen displaying an interactive interface according to some embodiments of the present disclosure.

FIG. 2 illustrates a schematic diagram of a display screen displaying an interactive interface according to some embodiments of the present disclosure. As shown in FIG. 2, display screen 10 displays a display interface. The display interface includes a display object 1003. In some embodiments, display screen 10 includes an inner contour 1002 and an outer contour 1001. The display pixels of display screen 10 are within a display area formed between the outer contour 1001 and the inner contour 1002. The target interactive area 11 corresponds to the inner contour 1002. That is, the target interactive area 11 matches the inner contour 1002 of the display screen. The target interactive area 11 matches a hole formed by the inner contour 1002 of the display screen.

In some other embodiments, a plurality of inner contours can be arranged on the display screen, e.g., another inner contour 12 in FIG. 2. An area formed by the inner contour 12 is another hole in the display screen. A part of a hardware component such as a camera and a flashlight of the electronic device can be exposed through the hole. Thus, the outer contour of the hole corresponding to the target interactive area 11 can be the inner contour 1002 of the display screen 10. A lens assembly of a first camera is exposed through the hole corresponding to the target interactive area 11. A lens assembly of a second camera is exposed through the hole corresponding to the inner contour 12. The display area of display screen 10 is an area between the outer contour 1001 and the inner contour 1002.

At 103, a trajectory of an operation object is obtained.

According to a first implementation method, as shown in FIG. 2, the operation object is a display object 1004 in the interactive interface, such as a bouncing ball. FIG. 2 shows an interactive interface of a bouncing ball game. A display object 1003 such as a division board or a hole is arranged in the interactive interface. Obtaining the trajectory of the operation object can include obtaining a movement trajectory of the display object 1004 on the interactive interface by obtaining a position coordinate of the display object 1004 in the interactive interface in real-time. For example, as shown in FIG. 2, in response to the operation of the electronic device, the display object 1004 moves to form the trajectory route 1005 shown in FIG. 2 and moves eventually to the target interactive area 11.

According to a second implementation method, obtaining the trajectory of the operation object can include obtaining an operation trajectory of an operation body through a sensor. The operation object can be the operation body. The sensor can be a transparent touch layer covering the display screen. The transparent touch layer can cover the area formed by the inner contour. An operation trajectory (i.e., touch point) of the operation object, such as a stylus or a finger, can be obtained by touch and sensing. The sensor can also be a camera exposed through the hole formed by the inner contour of the display screen. The operation trajectory of the operation object, i.e., the operation object such as the stylus and finger, in the area formed by the inner contour can be obtained through the camera.

At 104, if the trajectory of the operation object and the target interactive area satisfy the trigger condition of the interactive action of the target interactive area, the interactive action is performed.

According to the first implementation method, if the movement trajectory of the display object 1004 and the target interactive area 11 satisfy the trigger condition of the interactive action of the target interactive area 11, the interaction action can be performed. For example, the trigger condition can include that the movement trajectory overlaps the target interactive area. If the movement trajectory overlaps with the target interactive area, the interactive action can be performed to hide the display object 1004 to represent that the display object 1004 disappears in at the inner contour 1002.

According to the second implementation method, if the operation trajectory of the operation body and the target interactive area 11 satisfies the trigger condition of the interactive action of the target interactive area, the interactive action can be performed. For example, the trigger condition can include whether the touch point of the operation body belongs to the target interactive area 11. If the touch point of the operation body belongs to the target interactive area 11, the corresponding interactive action can be performed. For example, the hardware component exposed through the area formed by the inner contour can be activated (the camera is activated). In some embodiments, the user can configure the interactive actions for the target interactive area. Then, when the trigger condition is satisfied, the interactive action configured by the user can be performed, for example, when the touch point of the operation body belongs to the target interactive area 11.

In embodiments of the present disclosure, when the trajectory of the operation object partially overlaps with the target interactive area 11, that is, the trigger condition of the interactive action of the target interactive area is satisfied, the interactive action can be performed. In some embodiments, performing the interactive action can include at least one of the following.

The display effect of the operation object can be changed. The operation object can be a virtual object displayed within the display area.

Figure 3:
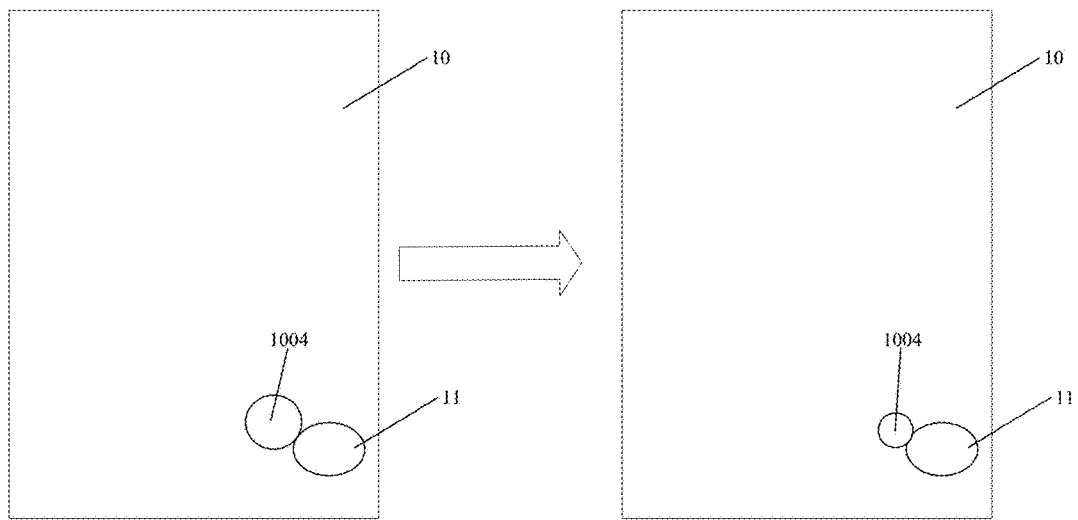
FIG. 3 illustrates a schematic diagram showing a display effect of changing a virtual object in a display area according to some embodiments of the present disclosure.

As shown in FIG. 3, when the trajectory of the operation object and the target interactive area 11 have an overlap part, the size of the virtual object, e.g., a bouncing ball 1004, can be modified, that is, the virtual object, e.g., the bouncing ball 1004, shrinks at the inner contour 1002 (the edge of the target interactive area 11), to represent the effect of the bouncing ball 1004 gradually falling into the hole formed by the inner contour of the display screen.

Figure 4:
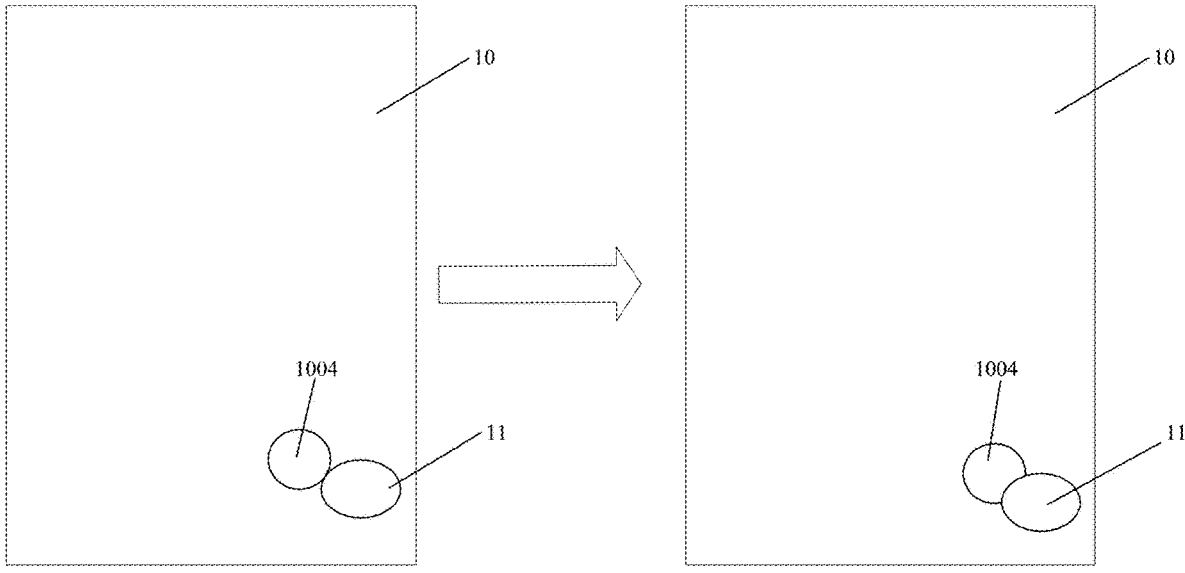
FIG. 4 illustrates a schematic diagram showing a display effect of changing a virtual object in a display area according to some embodiments of the present disclosure.

In some other embodiments, as shown in FIG. 4, when the trajectory of the operation object and the target interactive area 11 are determined to have an overlap part, a block relationship between the display area of the virtual object, e.g., the bouncing ball 1004, and the target interactive area 11 can be changed to display that the virtual object, e.g., the bouncing ball 1004, is gradually covered by the target interactive area 11 to represent an effect of the bouncing ball 1004 being gradually swallowed by the hole formed by the inner contour of the display screen.

Figure 5:
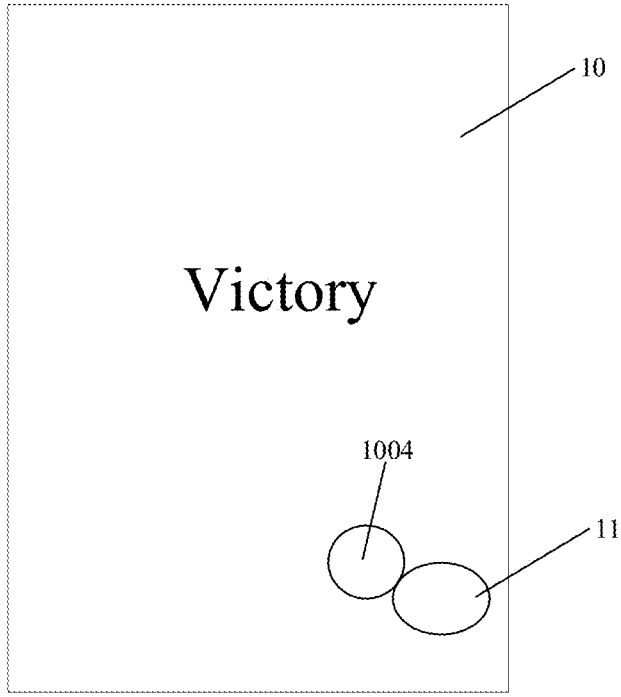
FIG. 5 illustrates a schematic diagram showing a display effect of changing a virtual object in a display area according to some embodiments of the present disclosure.

The display effect of the interactive interface can be changed. The operation object can be the virtual object displayed in the display area. FIG. 5 illustrates a schematic diagram showing a display effect of changing the virtual object in the display area according to some embodiments of the present disclosure. As shown in FIG. 5, for example, when the trajectory of the operation object is detected to have an overlap part with the target interactive area 11, the display effect of the interactive interface can be modified, e.g., outputting patterns or text such as "Victory," outputting patterns such as flowers, or controlling the interactive interface to output in a color effect.

Figure 6:
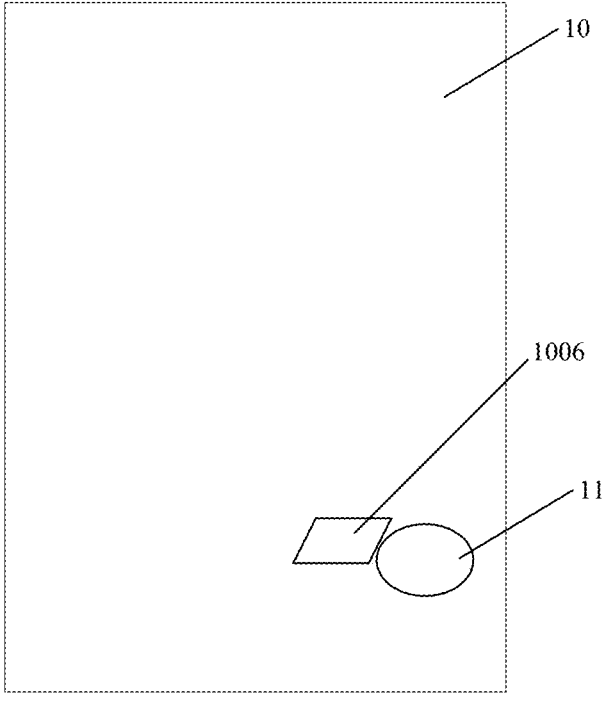
FIG. 6 illustrates a schematic diagram showing a display effect of changing a virtual object in a display area according to some embodiments of the present disclosure.

The operation object and the data corresponding to the operation object can be deleted. The operation object can be the virtual object displayed in the display area. FIG. 6 illustrates a schematic diagram showing the display effect of changing the virtual object in the display area according to some embodiments of the present disclosure. As shown in FIG. 6, for example, the operation object is folder 1006. The interactive action configured for the target interactive area 11 is deleting. When the movement trajectory of the operation object is detected to have an overlap part with the target interactive area 11, the folder 1006 and data such as documents in the folder 1006 can be deleted. The operation object can be the controller (e.g., an application icon) of the interactive interface of display screen 10. If the operation object of performing the deletion operation is the icon of the application, the application corresponding to the icon can be deleted.

FIG. 7A illustrates a schematic flowchart of a processing method according to some embodiments of the present disclosure. As shown in FIG. 7A, the processing method of the present disclosure includes the following steps.

At 701, the interactive interface is obtained. The interactive interface includes a target interactive area.

At 702, by displaying the interactive interface on the display screen, the target interactive area is not able to be displayed since the display screen does not have the display pixels corresponding to the target interactive area.

At 703, the trajectory of the operation object is obtained.

Steps 701 to 703 are similar to the embodiments above, which are not repeated here.

At 704, if the trajectory of the operation object and the target interactive area satisfy the trigger condition of the interactive action of the target interactive area, and the contour of the operation object is smaller than the target interactive area, the target interactive area corresponds to the first interactive action. If the trajectory of the operation object and the target interactive area satisfy the trigger condition of the interactive action of the target interactive area, and the contour of the operation object is larger than the target interactive area, the target interactive area corresponds to the second interactive action. The first interactive action and the second interactive action are different. The operation object is the virtual object included in the interactive interface displayed within the display area. If the operation object is a circle, a comparison is made between the diameter or radius of the operation object and a diameter or radius of the interactive area. If the operation object is a square or rectangle, a comparison is made between a shorter or longer side of the operation object and a shorter or longer side of the interactive area.

In embodiments of the present disclosure, the contour of the operation object can be smaller than the target interactive area 11. As shown in FIG. 3, when the trajectory of the operation object and the target interactive area 11 have an overlap part, the display effect of the bouncing ball 1004 gradually falling into the hole indicated by the target interactive area 11 can be represented by changing the size of the virtual object such as the bouncing ball 1004. That is, virtual objects such as the bouncing ball 1004 can gradually shrink. In some other embodiments, as shown in FIG. 4, by changing the display area of the virtual object such as the bouncing ball 1004, the virtual object such as the bouncing ball 1004 can be gradually covered by the target interactive area 11, which represents the effect of the bouncing ball 1004 being gradually swallowed by the hole indicated by the target interactive area 11.

Figure 8:
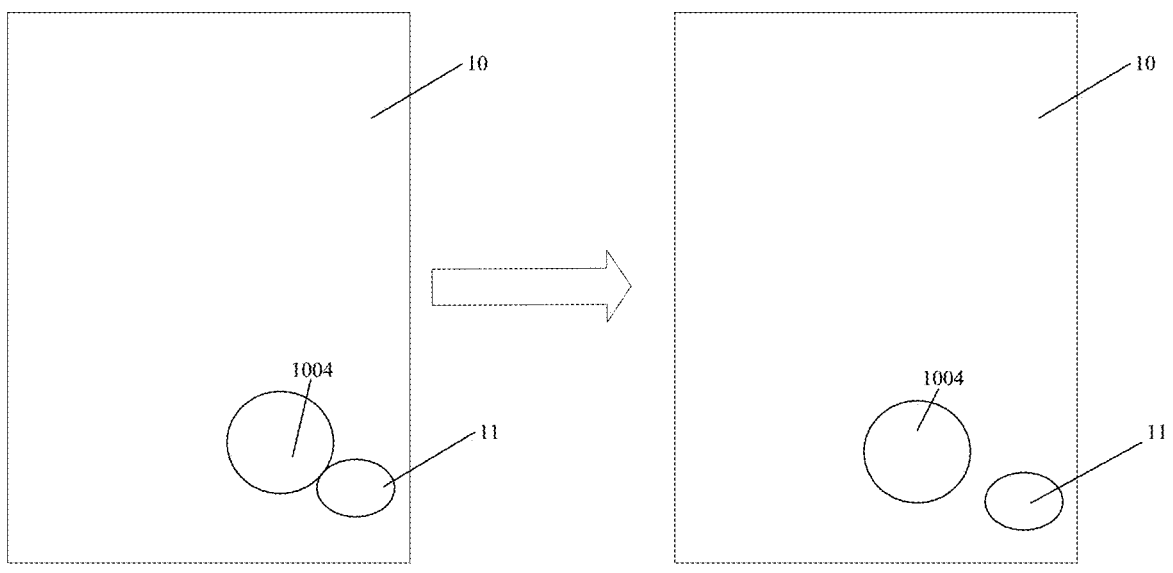
FIG. 8 illustrates a schematic diagram showing a display effect of changing a virtual object in a display area according to some embodiments of the present disclosure.

In embodiments of the present disclosure, if the contour of the operation object is larger than the target interactive area 11, the target interactive area can correspond to the second interactive action. FIG. 8 illustrates a schematic diagram showing the display effect of changing the virtual object in the display area according to some embodiments of the present disclosure. As shown in FIG. 8, for example, if the trajectory of the operation object such as the bouncing ball 1004 is detected to have an overlap part with the target interactive area 11, since the contour of the bouncing ball 1004 is greater than the target interactive area 11, the movement trajectory of the bouncing ball 104 can be changed. For example, the target interactive area 11 can cause the bouncing ball 1004 to bounce away.

FIG. 7B illustrates another schematic flowchart of the processing method of FIG. 7A.

FIG. 7B illustrates an alternative schematic flowchart for the processing method depicted in FIG. 7A. As shown in FIG. 7B, steps 701 to 703 of the processing method of the present disclosure are the same as the steps in FIG. 7A, and only step 704' and step 704 are different.

According to another implementation method, at step 704', if the contour of the operation object is smaller than the target interactive area, and the trajectory of the operation object and the target interactive area satisfy the first trigger condition of the interactive action of the target interactive area, the target interactive area can correspond to the first interactive action. If the contour of the operation object is greater than the target interactive area, and the trajectory of the operation object and the target interactive area satisfy the second trigger condition of the interactive action of the target interactive area, the target interactive area can correspond to the second interactive action. The first interactive action and the second interactive action can be different. The trigger conditions of the interactive action of the target interactive area satisfied by the trajectory of the operation object and the target interactive area can be different. Step 704' can replace step 704. The operation object can be the virtual object included in the interactive interface displayed in the display area. The interactive action can be the same as the interactive action in step 704. For example, the interactive action can be applied to the interactive scenarios shown in FIG. 3, FIG. 4, or FIG. 8, which is not repeated here.

In embodiments of the present disclosure, for example, performing the interactive action can further include changing the operation state of the component exposed by the inner contour of the display screen. For example, the component can be switched from the non-operation state to the operation state, or from the operation state to the non-operation state.

In some embodiments, the operation trajectory of the operation body is obtained through the sensor. The sensor can be the transparent touch layer covering the display screen. The transparent touch layer can cover the area of the inner contour, i.e., the hole. For example, the operation trajectory of the stylus or finger can be obtained through touching and sensing. The sensor can also be the camera exposed through the hole formed by the inner contour of the display screen. The operation trajectory of the operation object, i.e., the operation body such as the stylus or finger, in the area formed by the inner contour can be obtained through the camera. When the trajectory of the operation object is determined to overlap with the target interactive area 11, the component such as the camera or torch exposed through the hole formed by the inner contour of the display screen can be activated. Thus, the camera or the torch can be in the operation state. That is, the trajectory of the operation object can overlap with the target interactive area 11, which can be used as an activation instruction for activating the component exposed through the hole formed by the inner contour of the display screen. Thus, the corresponding component can be in the operation state.

In some embodiments, when the trajectory of the operation object and the target interactive area 11 are determined to have the overlap part, for example, the trajectory of the virtual object such as the bouncing ball 1004 is determined to overlap with the target interactive area 11, the component such as the camera or flashlight exposed through the hole formed by the inner contour of the display screen can be activated. Thus, the camera or the flashlight can be in the operation state. That is, the component such as the camera or flashlight can be in a closed state before. In some other embodiments, the trajectory of the virtual object such as the bouncing ball 1004 can be determined to overlap with the target interactive area 11, the component such as the camera or flashlight exposed through the hole of the target interactive area 11 can be closed. Components such as the camera or flashlight can be in the closed state before.

In embodiments of the present disclosure, the operation body being the bouncing ball 1004 can be taken as an example for description. The operation object can also be an indication object of the input device connected to the electronic device of performing the above method displayed on the display screen. For example, the operation object can be a cursor displayed on the display screen when the mouse or the touchpad is operated (e.g., operated by the user). When the trajectory of the cursor and the target interactive area 11 are determined to have an overlap part, the component such as the camera or flashlight exposed through the hole formed by the inner contour of the display screen can be activated. Thus, the camera or the flashlight can be in the operation state. That is, the component such as the camera or flashlight can be in the closed state before. In some other embodiments, the component such as the camera or flashlight exposed through the hole of the target interactive area 11 can be closed. Components such as the camera or flashlight can be in the closed state before.

Figure 9:
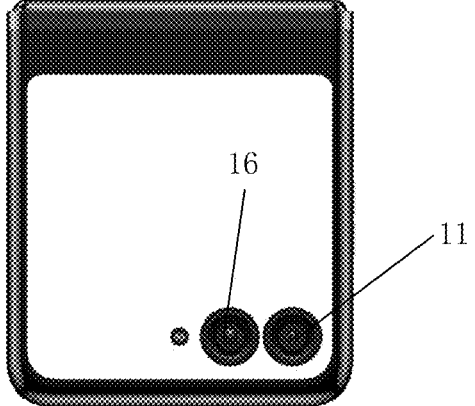
FIG. 9 illustrates a schematic diagram of a multi-object interactive area in a display area according to some embodiments of the present disclosure.

In embodiments of the present disclosure, for example, the target interactive area can include a first target interactive area 11 and a second target interactive area 16. The first target interactive area 11 cannot be displayed since the display screen does not have the display pixels corresponding to the target interactive area. The display effect of the virtual display object of the second target interactive area 16 can be consistent with the representation effect of the component exposed through the inner contour of the display screen. FIG. 9 illustrates a schematic diagram of a multi-object interactive area in the display area according to some embodiments of the present disclosure. As shown in FIG. 9, for the target interactive area, the first target interactive area 11 matches the shape of the hole formed by the first target interactive area 11 and the inner contour of the display screen. The first target interactive area 11 can be represented as the camera exposed by the hole formed by the inner contour of the display screen. The second target interactive area 16 can be in the display area formed between the outer contour 1001 and the inner contour 1002. The display effect of the display area corresponding to the second target interactive area 16 can be similar to the camera exposed through the hole formed by the inner contour of the first target interactive area 15. That is, the second target interactive area 16 can display the virtual image of the camera. Thus, the camera image displayed in the second target interactive area 16 can have a similar display effect to the camera exposed through the hole formed by the inner contour of the first target interactive area 11. The inconvenience caused by the hole in the display screen can be further compensated. For example, the second target interactive area 16 can be in another diagonal area of the display interface of the display screen. Thus, the second target interactive area 16 and the first target interactive area 11 can be symmetrical about the center. That is, the component image displayed in the second target interactive area 16 can be similar to the display effect of the camera exposed through the hole formed by the inner contour of the first target interactive area 11. Thus, the inconvenience of the hole in the display screen can be further compensated. For example, the second target interactive area 16 can be in another diagonal area of the display interface of the display screen. Thus, the second target interactive area 16 and the first target interactive area 11 can be symmetrical about the center. Thus, when the second target interactive area 16 displays the component image, which has a similar display effect of the component exposed through the hole formed by the inner contour where the first target interactive area 11 is, the viewing feeling of the display screen can be more natural. Thus, the second target interactive area 16 can display the image of any device or component such as the virtual image of the camera, flashlight, etc.

Figure 10:
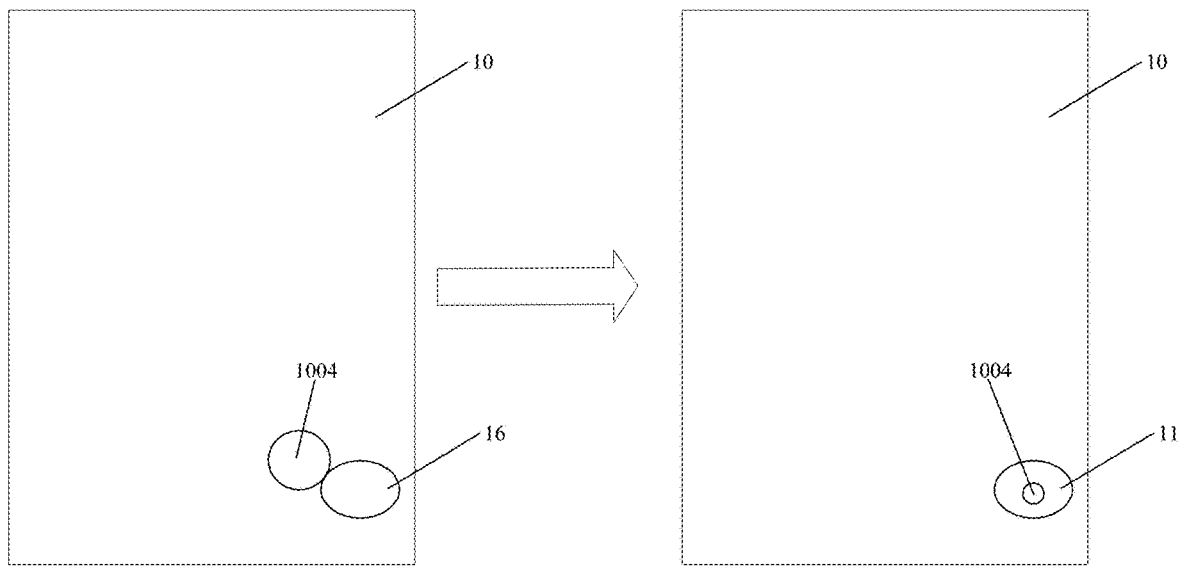
FIG. 10 illustrates a schematic diagram of a multi-object interactive area in a display area according to some embodiments of the present disclosure.
Figure 11:
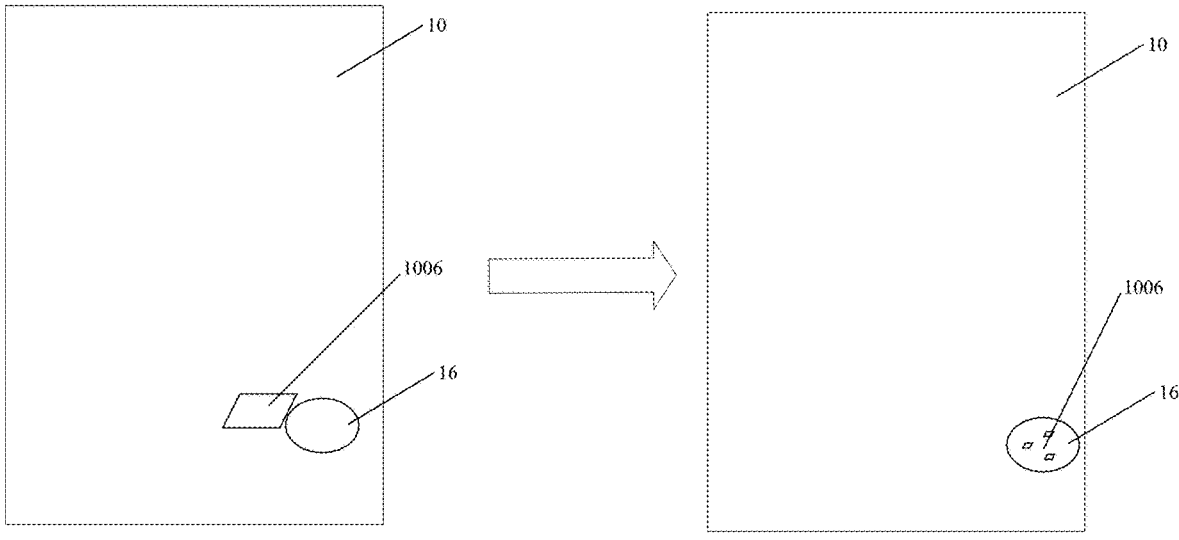
FIG. 11 illustrates a schematic diagram showing a display effect of changing a virtual object in a display area according to some embodiments of the present disclosure.

In embodiments of the present disclosure, since the second target interactive area 16 is the display area formed between the outer contour 1001 and the inner contour 1002. The display area can have the corresponding display pixel. FIG. 10 illustrates a schematic diagram of a multi-object interactive area in the display area according to some embodiments of the present disclosure. As shown in FIG. 10, when the trajectory of the operation object and the second target interactive area 16 satisfy the trigger condition of the interactive action of the target interactive area 16, the corresponding interactive action can be performed. For example, when the trajectory of the operation object and the second target interactive area 16 are determined to have an overlap part, the size of the virtual object such as the bouncing ball 1004 can be modified. Thus, the display effect of the virtual object such as the bouncing ball 1004 gradually shrinking in the second target interactive area 16 can be consistent or similar to the effect of performing the interactive action when the bouncing ball 1004 satisfies the trigger condition with the first target interactive area (i.e., the area (the physical hole) formed by the first target area and the inner contour of the display screen cannot be displayed). For example, the effect can include that the virtual object can gradually shrink in the second target interactive area to simulate the effect of gradually falling in the hole (i.e., a virtual hole). In some other embodiments, as shown in FIG. 11, when the trajectory of the operation object and the second target interactive area 16 are determined to have an overlap part, the size of the virtual object such as the bouncing ball 1004 can be changed. That is, the virtual object such as the bouncing ball 1004 can continuously shrink in the second target interactive area 16, which is consistent or similar to the effect of performing the interactive action when the bouncing ball 1004 satisfies the trigger condition with the first target area. That is, the area (the physical hole) formed by the first target area and the inner contour of the display screen. For example, the effect can include that the virtual object gradually shrinks in the second target interactive area to gradually fall into the hole (i.e., the virtual hole).

As shown in FIG. 11, for example, the operation object is folder 1006. The interactive action configured for the second target interactive area 16 is deletion. When the movement trajectory of folder 1006 and the second target interactive area 16 are detected to have an overlap part, data such as the folder 1006 and the files in the folder 1006 can be deleted. As shown in FIG. 11, the display effect of folder 1006 being shattered is displayed through the second target interactive area 16. The operation object can also be a controller (e.g., the icon of the application) within the interactive interface of display screen 10. If the operation object of performing the deletion is the icon of the application, the application corresponding to the icon can be deleted.

In connection with the FIG. 4 to FIG. 6 and FIG. 8, when effects of a ball falling into a hole and file deletion, the representation effect images corresponding to the actions that are performed can be simulated in the display area of the second target interactive area 16. The corresponding virtual representation images can be displayed through the second target interactive area 16.

Figure 12:
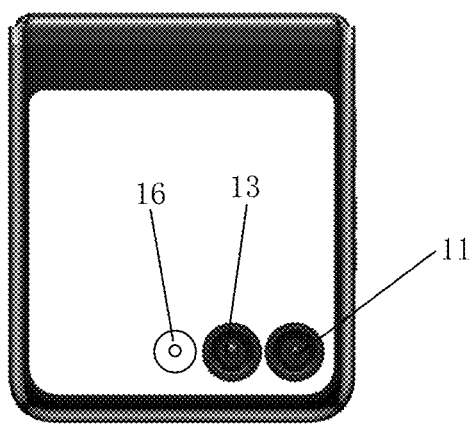
FIG. 12 illustrates a schematic diagram showing a display effect of changing a virtual object in a display area according to some embodiments of the present disclosure.

FIG. 12 illustrates a schematic diagram showing a display effect of changing the virtual object in the display area according to some embodiments of the present disclosure. As shown in FIG. 12, the target interactive area includes a first target interactive area 11, a second target interactive area 16, and a third target interactive area 13. The areas where the first target interactive area 11 and the third target interactive area 13 are located are holes that are covered by the inner contours. The areas cannot be displayed since no display pixel is configured in the areas. The camera can be arranged in the hole of the inner contour. The camera can be exposed through the hole. The display area can be formed between the outer contour 1001 and the inner contour 1002. That is, the second interactive area 16 can be a part of the display area, which is configured with display pixels and can be displayed. In some embodiments, the second target interactive area 16 can be displayed as a virtual image of the flashlight.

When the trajectory of the operation object such as the bouncing ball 1004 and the second target interactive area 16 are detected to have an overlap part, the flashlight displayed in the second target interactive area 16 can be illuminated. For example, by changing the display brightness of the display pixels of the second target interactive area 16, an illumination state of the flashlight can be characterized, which can enhance the display brightness of the display pixels as the illumination of the flashlight.

In some embodiments, the operation trajectory of the operation body such as the finger or touchpad can be obtained by the sensor. When the trajectory of the operation body is determined to overlap with the second target interactive area 16, the flashlight displayed in the second target interactive area 16 can be illuminated.

In some embodiments, the operation body can be the cursor displayed on the display screen when the mouse or touchpad is operated. When the trajectory of the cursor and the second target interactive area 16 are determined to have an overlap part, the flashlight displayed in the second target interactive area 16 can be illuminated.

Figure 13:
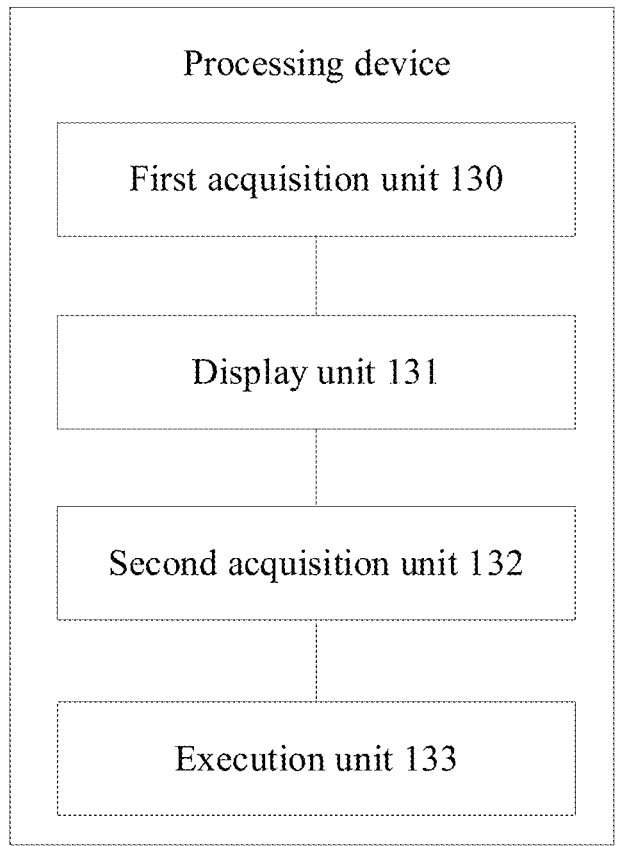
FIG. 13 illustrates a schematic structural diagram of a processing device according to some embodiments of the present disclosure.

FIG. 13 illustrates a schematic structural diagram of a processing device according to some embodiments of the present disclosure. As shown in FIG. 13, the processing device of embodiments of the present disclosure includes a first acquisition unit 130, a display unit 131, a second acquisition unit 132, and an execution unit 133.

The first acquisition unit 130 can be configured to obtain an interactive interface. The interactive interface can include the target interactive area.

The display unit 131 can be configured to display the interactive interface on the display screen. The target interactive area cannot be displayed since the display screen does not have the corresponding display pixels. The display screen can include an inner contour and an outer contour. The display pixels can be located in the display area formed between the outer contour and the inner contour. The target interactive area can correspond to the inner contour.

The second acquisition unit 132 can be configured to obtain the trajectory of the operation object.

The execution unit 133 can be configured to execute the interactive action when the trajectory of the operation object and the target interactive area satisfies the trigger condition of the interactive action of the target interactive area.

In some embodiments, performing the interactive action by the execution unit 133 can include at least one of changing the display effect of the operation object, changing the display effect of the interactive interface, or deleting the operation object and the data corresponding to the operation object. The operation object can be a virtual object displayed within the display area.

In some embodiments, the second acquisition unit 132 can be further configured to obtain the trajectory of the operation body through the sensor. The operation object can be the operation body.

In some embodiments, the execution unit 133 can be further configured to, if the contour of the operation object is smaller than the target interactive area, determine the first interactive action corresponding to the target interactive area, and if the contour of the operation object is greater than the target interactive area, determine the second interactive action corresponding to the target interactive area. The first interactive action can be different from the second interactive action. The operation object can be the virtual object displayed in the display area.

In some embodiments, executing the interactive action can include changing the operation state of the component exposed by the inner contour of the display screen.

In some embodiments, the target interactive area can include the first target interactive area and the second target interactive area. The first target interactive area cannot be displayed since the display screen does not have the display pixels corresponding to the target interactive area. The display effect of the virtual display object of the second target interactive area can be consistent with the representation effect of the component exposed by the inner contour of the display screen.

In some embodiments, the first acquisition unit 130, the display unit 131, the second acquisition unit 132, and the execution unit 133 can be implemented by one or more of central processing units (CPUs), graphics processing units (GPUs), application-specific integrated circuits (ASICs), digital signal processors (DSPs), programmable logic devices (PLDs), field-programmable gate arrays (FPGAs), microcontrollers (MCUs), microprocessors, or other electronic elements.

For the device of embodiments above, specific methods of the modules and units of performing the operations are described in embodiments of the present disclosure, which are not repeated here.

The present disclosure further provides an electronic device, including at least one processor and a memory communicatively connected to at least one processor.

The memory stores instructions executable by at least one processor that, when executed by the at least one processor, cause the at least one processor to perform the steps of the processing method according to the present disclosure.

The present disclosure also provides a non-transitory computer-readable storage medium storing computer instructions that, when executed by a computer, cause the computer to perform the steps of the processing method according to the present disclosure.

The processes above can be used, and steps can be reordered, added, or deleted. For example, the steps of the present disclosure can be performed in parallel, sequentially, or in different orders, as long as the expected result of the technical solution of the present disclosure can be realized, which is not limited here.

Moreover, terms such as "first" and "second" are used for descriptive purposes only, and should not be interpreted as indicating relative importance or implying a specific quantity of technical features. Thus, a feature designated by "first" or "second" can explicitly or implicitly include at least one such feature. In the description of the present disclosure, the term "a plurality of" means two or more, unless explicitly specified otherwise.

The above are merely some embodiments of the present disclosure. However, the scope of the present disclosure is not limited to this. Those skilled in the art can easily think of changes or replacements within the scope of the present disclosure. These changes and replacements should be within the scope of the present disclosure. The scope of the application is subject to the scope of the claims.

What is claimed is:

1. A processing method comprising:
   obtaining an interactive interface, where the interactive interface includes a target interactive area;
   displaying the interactive interface through a display screen, wherein the display screen does not have display pixels corresponding to the target interactive area, the display screen includes an inner contour and an outer contour, display pixels of the display screen are in a display area formed between the outer contour and the inner contour, the target interactive area corresponds to the inner contour, and the inner contour forms a hole in the display screen;
   obtaining a trajectory of an operation object; and
   in response to the trajectory of the operation object and the target interactive area satisfying a trigger condition of an interactive action of the target interactive area, executing the interactive action, wherein the trigger condition of the interactive action is satisfied when the trajectory of the operation object has an overlap part with the target interactive area, and
wherein the executing the interactive action includes changing an operation state of a hardware component exposed through the hole formed by the inner contour of the display screen.

2. The method according to claim 1, wherein executing the interactive action includes at least one of:
   changing a display effect of the operation object;
   changing a display effect of the interactive interface; or
   deleting the operation object and data corresponding to the operation object;
   wherein the operation object is a virtual object displayed in the display area.

3. The method according to claim 1, wherein obtaining the trajectory of the operation object includes:
   obtaining the trajectory of the operation object through a sensor, the operation object being an operation body.

4. The method according to claim 1, further comprising:
   in response to a contour of the operation object being smaller than the target interactive area, determining that the target interactive area corresponds to a first interactive action; and
   in response to the contour of the operation object being greater than the target interactive area, determining that the target interactive area corresponds to a second interactive action;
   wherein:
      the first interactive action is different from the second interactive action; and
      the operation object is a virtual object displayed in the display area.

5. The method according to claim 1, wherein:
   the target interactive area includes a first target interactive area and a second target interactive area;
   the first target interactive area is not displayed since the display screen does not have the display pixels corresponding to the target interactive area; and
   a display effect of a virtual display object of the second target interactive area is consistent with a representation effect of the component exposed by the inner contour of the display screen.

6. The processing method according to claim 1, wherein the changing the operation state comprises switching the hardware component from a non-operation state to an operation state, or from an operation state to a non-operation state.

7. A processing device comprising:
   a processor; and
   a memory coupled to the processor, the memory storing instructions which, when executed by the processor, cause the processor to:
   obtain an interactive interface, wherein the interactive interface includes a target interactive area,
   display the interactive interface through a display screen, wherein the display screen does not have display pixels corresponding to the target interactive area, the display screen includes an inner contour and an outer contour, display pixels of the display screen are in a display area formed between the outer contour and the inner contour, the target interactive area corresponds to the inner contour, and the inner contour forms a hole in the display screen;
   obtain a trajectory of an operation object; and
   in response to the trajectory of the operation object and the target interactive area satisfying a trigger condition of an interactive action of the target interactive area, execute the interactive action, wherein the trigger condition of the interactive action is satisfied when the trajectory of the operation object has an overlap part with the target interactive area, and wherein the executing the interactive action includes changing an operation state of a hardware component exposed through the hole formed by the inner contour of the display screen.

8. The device according to claim 7, wherein the processor is further to:

change a display effect of the operation object;

change a display effect of the interactive interface; or delete the operation object and data corresponding to the operation object;

wherein the operation object is a virtual object displayed in the display area.

9. The device to claim 7, wherein the processor is further to:

obtain the trajectory of the operation object through a sensor, the operation object being an operation body.

10. The device according to claim 7, wherein the processor is further to:

in response to a contour of the operation object being smaller than the target interactive area, determine that the target interactive area corresponds to a first interactive action; and in response to the contour of the operation object being greater than the target interactive area, determine that the target interactive area corresponds to a second interactive action;

wherein:

the first interactive action is different from the second interactive action; and the operation object is a virtual object displayed in the display area.

11. The device according to claim 7, wherein:

the target interactive area includes a first target interactive area and a second target interactive area;

the first target interactive area is not displayed since the display screen does not have the display pixels corresponding to the target interactive area; and a display effect of a virtual display object of the second target interactive area is consistent with a representation effect of the component exposed by the inner contour of the display screen.

12. A non-transitory computer-readable storage medium storing executable instructions that, when executed by a processor, cause the processor to:

obtain an interactive interface, wherein the interactive interface includes a target interactive area;

display the interactive interface through a display screen, wherein the display screen does not have display pixels corresponding to the target interactive area, the display screen includes an inner contour and an outer contour, display pixels of the display screen are in a display area formed between the outer contour and the inner contour, the target interactive area corresponds to the inner contour, and the inner contour forms a hole in the display screen;

obtain a trajectory of an operation object; and in response to the trajectory of the operation object and the target interactive area satisfying a trigger condition of an interactive action of the target interactive area, execute the interactive action, wherein the trigger condition of the interactive action is satisfied when the trajectory of the operation object has an overlap part with the target interactive area, and wherein the executing the interactive action includes changing an operation state of a hardware component exposed through the hole formed by the inner contour of the display screen.

13. The storage medium according to claim 12, wherein the processor is further configured to:

change a display effect of the operation object;

change a display effect of the interactive interface; or delete the operation object and data corresponding to the operation object;

wherein the operation object is a virtual object displayed in the display area.

14. The storage medium to claim 12, wherein the processor is further configured to:

obtain the trajectory of the operation object through a sensor, the operation object being an operation body.

15. The storage medium according to claim 12, wherein the processor is further configured to:

in response to a contour of the operation object being smaller than the target interactive area, determine that the target interactive area corresponds to a first interactive action; and in response to the contour of the operation object being greater than the target interactive area, determine that the target interactive area corresponds to a second interactive action;

wherein:

the first interactive action is different from the second interactive action; and the operation object is a virtual object displayed in the display area.

16. The storage medium according to claim 12, wherein:

the target interactive area includes a first target interactive area and a second target interactive area;

the first target interactive area is not displayed since the display screen does not have the display pixels corresponding to the target interactive area; and a display effect of a virtual display object of the second target interactive area is consistent with a representation effect of the component exposed by the inner contour of the display screen.

* * * * *